US008987614B2

(12) United States Patent
Sorimachi

(10) Patent No.: US 8,987,614 B2
(45) Date of Patent: Mar. 24, 2015

(54) PASSENGER DETECTING APPARATUS HAVING LOAD DETECTING DETERMINING PART AND SEAT CONDITION DETERMINING PART

(75) Inventor: Mutsumi Sorimachi, Saitama (JP)

(73) Assignee: Calsonic Kansei Corporation, Saitama (JP)

( * ) Notice: Subject to any disclaimer, the term of this patent is extended or adjusted under 35 U.S.C. 154(b) by 261 days.

(21) Appl. No.: 13/425,767

(22) Filed: Mar. 21, 2012

(65) Prior Publication Data

US 2012/0285752 A1 Nov. 15, 2012

(30) Foreign Application Priority Data

May 13, 2011 (JP) .................................. 2011-108331

(51) Int. Cl.
*B60R 21/015* (2006.01)
*G01G 23/01* (2006.01)
*G01G 19/414* (2006.01)
(Continued)

(52) U.S. Cl.
CPC .............. *B60N 2/002* (2013.01); *G01G 3/1414* (2013.01); *G01G 23/01* (2013.01); *G01G 19/4142* (2013.01); *B60R 21/01516* (2014.10)
USPC ....................................................... 177/136

(58) Field of Classification Search
CPC .................. B60R 21/015; B60R 2021/01516; G01G 19/4142; G01G 3/1414; G01G 23/01; B60N 2/002
USPC ......... 177/25.13, 136, 144, 184, 185; 701/45; 702/101, 102; 180/273; 280/735; 73/862.041, 1.13, 1.15
See application file for complete search history.

(56) References Cited

U.S. PATENT DOCUMENTS 4,347,903 A * 9/1982 Yano et al. .................. 177/25.13
4,529,050 A * 7/1985 Mosher et al. ..................... 177/1
(Continued)

FOREIGN PATENT DOCUMENTS

DE     19741451 A1    3/1999
DE     10013326 A1    9/2001
(Continued)

OTHER PUBLICATIONS

Extended European Search Report dated Aug. 29, 2012 for the corresponding European Patent Application No. 12002207.4.

*Primary Examiner* — Randy W Gibson
(74) *Attorney, Agent, or Firm* — Global IP Counselors, LLP

(57) ABSTRACT

A vehicle passenger detection apparatus includes a load detecting part and a seat condition determining part. The seat condition determining part includes a vibration threshold value setting section, a vibration determining section and a seat determining section. The vibration threshold value setting section sets a vibration threshold value based on the load detection signal such that the vibration threshold value is higher when a fluctuation amount of the load detection signal is small than when the fluctuation amount of the load detection signal is large. The seat determining section executes a seating determination based on the load detection signal when the vibration determining section determines that the vehicle vibration is not occurring based on the load detection signal and the vibration threshold value, and to defer execution of the seating determination to maintain a previous seating determination result when the vibration determining section determines that the vehicle vibration is occurring.

4 Claims, 7 Drawing Sheets

(51) Int. Cl.
    *B60N 2/00*    (2006.01)
    *G01G 3/14*    (2006.01)

(56) References Cited

U.S. PATENT DOCUMENTS

| | | | |
|---|---|---|---|
| 6,271,484 B1 * | 8/2001 | Tokutsu | 177/25.13 |
| 6,479,766 B2 * | 11/2002 | Gray et al. | 177/144 |
| 6,609,054 B2 * | 8/2003 | Wallace | 701/45 |
| 6,876,299 B2 * | 4/2005 | Sakai et al. | 340/436 |
| 6,957,168 B2 * | 10/2005 | Tanabe et al. | 702/173 |
| 7,289,894 B2 * | 10/2007 | Wanami et al. | 701/45 |
| 7,363,184 B2 * | 4/2008 | Hibner et al. | 702/101 |
| 7,562,735 B2 * | 7/2009 | Kobayashi et al. | 180/273 |
| 7,786,882 B2 | 8/2010 | Okawa | |
| 2008/0300804 A1 * | 12/2008 | Spruytte | 702/56 |
| 2010/0018327 A1 | 1/2010 | Kogure et al. | |
| 2013/0072767 A1 * | 3/2013 | Imamura et al. | 600/301 |
| 2013/0205915 A1 * | 8/2013 | Fujii | 73/862.53 |
| 2013/0211666 A1 * | 8/2013 | Fujii et al. | 701/34.4 |
| 2013/0211667 A1 * | 8/2013 | Fujii et al. | 701/34.4 |
| 2014/0266657 A1 * | 9/2014 | Fujii et al. | 340/438 |
| 2014/0277826 A1 * | 9/2014 | Fujii et al. | 701/1 |

FOREIGN PATENT DOCUMENTS

| | | | | |
|---|---|---|---|---|
| EP | 1703264 A2 | | 9/2006 | |
| EP | 2522965 A1 | * | 11/2012 | B60R 21/015 |
| JP | 4339368 B2 | | 10/2009 | |

* cited by examiner

PASSENGER DETECTING APPARATUS HAVING LOAD DETECTING DETERMINING PART AND SEAT CONDITION DETERMINING PART

CROSS-REFERENCE TO RELATED APPLICATIONS

This application claims priority to Japanese Patent Application No. 2011-108331 filed on May 13, 2011. The entire disclosure of Japanese Patent Application No. 2011-108331 is hereby incorporated herein by reference.

BACKGROUND

1. Technical Field

The present invention relates to a vehicle passenger detection apparatus that is installed in an automobile or other vehicle and used to determine whether or not to activate an air bag device provided in the vehicle.

2. Related Art

Air bag systems that can protect a passenger seated in a seat have been provided in automobiles and other vehicles for some time. Such an air bag system has a vehicle passenger detection apparatus that determines if a passenger is seated in a seat or not and if a seated passenger is an adult or a child. The vehicle passenger detection apparatus has a load sensor installed on a set periphery and a seat condition determining part that executes a seating determination based on a detection signal from a load sensor (e.g., see Japanese Patent Number 4339368). However, when the vehicle is moving or in another state in which a vehicle vibration occurs, a detection signal from the load sensor varies severely and there is a possibility a seating determination will be incorrect. Therefore, a vehicle passenger detection apparatus has been conceived that defers a seating determination at a previous determination result when the vehicle is moving or in another state in which vehicle vibrations are comparatively large and executes a seating determination when the vehicle is stopped or in another state in which vehicle vibrations are comparatively small.

SUMMARY

When a seating determination is executed or deferred depending on the size of a vehicle vibration, there are situations in which the precision of the seating determination may decline. For example, if a passenger boards the vehicle while it is stopped and does not sit fully and stably in the seat until after the vehicle is moving, then the precision of the seating determination will decline because the passenger did not have a stable posture when the vehicle was stopped and vehicle vibrations were comparatively small. Meanwhile, when the vehicle is moving and the passenger is seated in a stable fashion, the seating determination is deferred because the vehicle vibrations are comparatively large. Thus, in some cases, it is desirable to execute a seating determination while a vehicle is moving and vehicle vibrations are comparatively large.

Even when the vehicle is stopped and vehicle vibrations are comparatively small, if a seating determination is executed according to the size of vehicle vibrations, then there is a possibility that a vehicle vibration caused by a condition of a passenger will be detected and cause the seating determination to be deferred.

Therefore, an object of the present invention is to provide a vehicle passenger detection apparatus that can reduce deferments of a seating determination and increase opportunities for executing the seating determination when a size of a vehicle vibration is used to decide whether to execute or to defer a seating determination.

In order to achieve the aforementioned object, a vehicle passenger detection apparatus according to one aspect of the present invention includes a load detecting part and a seat condition determining part. The load detecting part is installed in the vicinity of a seat of a vehicle to detect a load acting on the seat. The seat condition determining part is configured to determine a condition of the seat based on a load detection signal from the load detecting part. The seat condition determining part includes a vibration threshold value setting section, a vibration determining section and a seat determining section. The vibration threshold value setting section is configured to set a vibration threshold value based on the load detection signal such that the vibration threshold value is higher when a fluctuation amount of the load detection signal is small than when the fluctuation amount of the load detection signal is large. The vibration determining section is configured to determine if the vehicle vibration is occurring based on the load detection signal and the vibration threshold value. The seat determining section is configured to execute a seating determination based on the load detection signal when the vibration determining section determines that the vehicle vibration is not occurring, and to defer execution of the seating determination to maintain a previous seating determination result when the vibration determining section determines that the vehicle vibration is occurring.

With this aspect of the present invention, the vibration threshold value setting section sets the vibration threshold value to a higher value when a fluctuation amount of the load detection signal is small than when the fluctuation amount of the load detection signal is large. Thus, setting the vibration threshold value higher serves to decrease the likelihood that the vibration determining section (which determines whether or not a vehicle vibration is occurring) will determine that a vehicle vibration has occurred. In other words, when the fluctuation amount of the load detection signal is small, the vibration determining section is more likely to determine that the vehicle vibration is not occurring than when the fluctuation amount of the load detection signal is large.

As a result, for example, when a passenger's posture causes a vibration to occur while the vehicle is moving or stopped, if the fluctuation amount of the load detection signal is small and the load detection signal is stable, then the vibration threshold value is set high and the apparatus will be more likely to determine that a vehicle vibration is not occurring. If it is determined that a vehicle vibration is not occurring, then the seat determining section executes a seating determination and the opportunities for executing a determination can be increased.

As a result, deferments of the seating determination can be decreased and opportunities for executing the seating determination can be increased when the size of a vehicle vibration is used to decide whether to execute or defer the seating determination.

BRIEF DESCRIPTION OF THE DRAWINGS

Referring now to the attached drawings which form a part of this original disclosure.

DETAILED DESCRIPTION OF EXEMPLARY EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
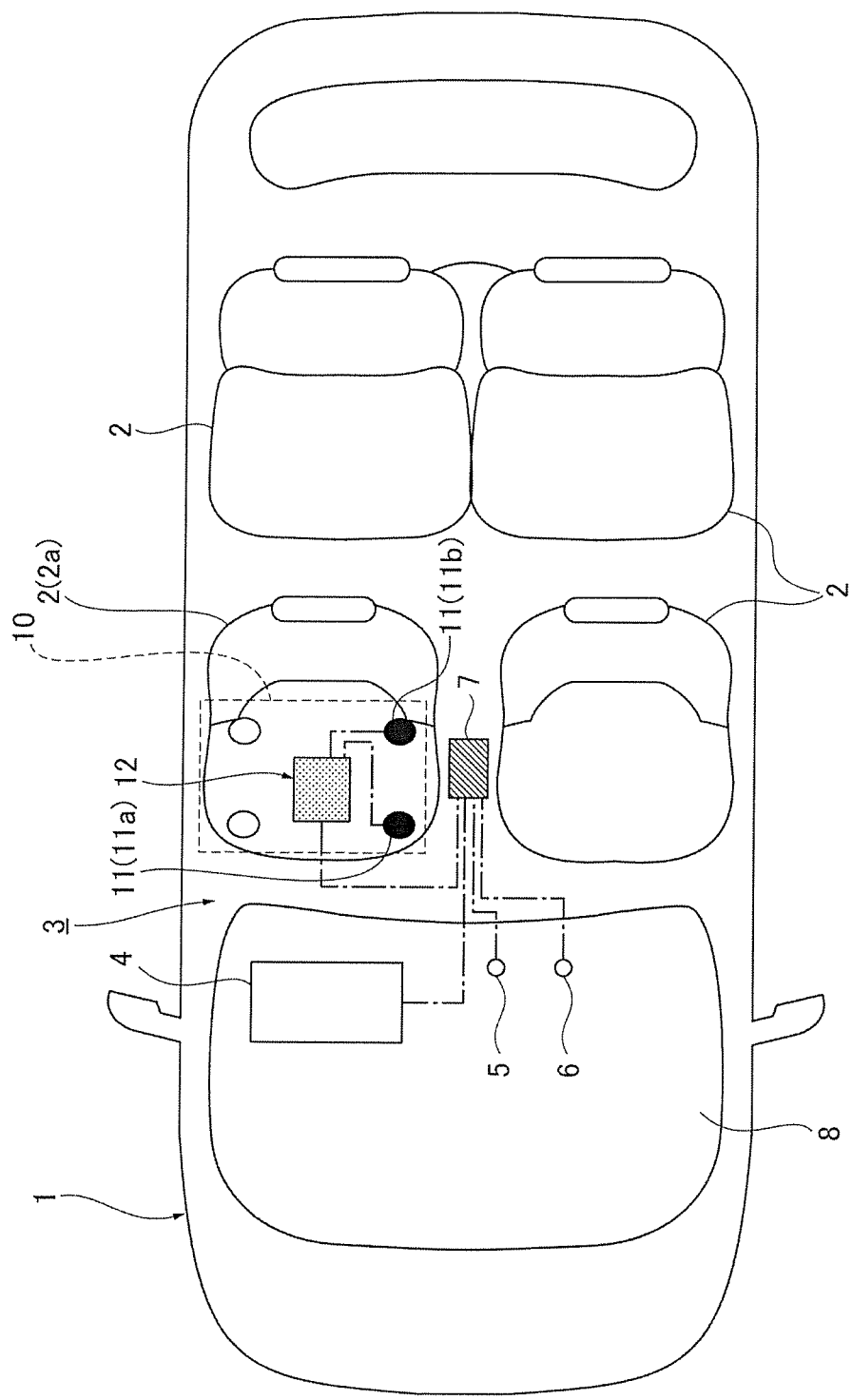
FIG. 1 is schematic plan view of a vehicle equipped with a vehicle passenger detection apparatus according to an embodiment.
Figure 2:
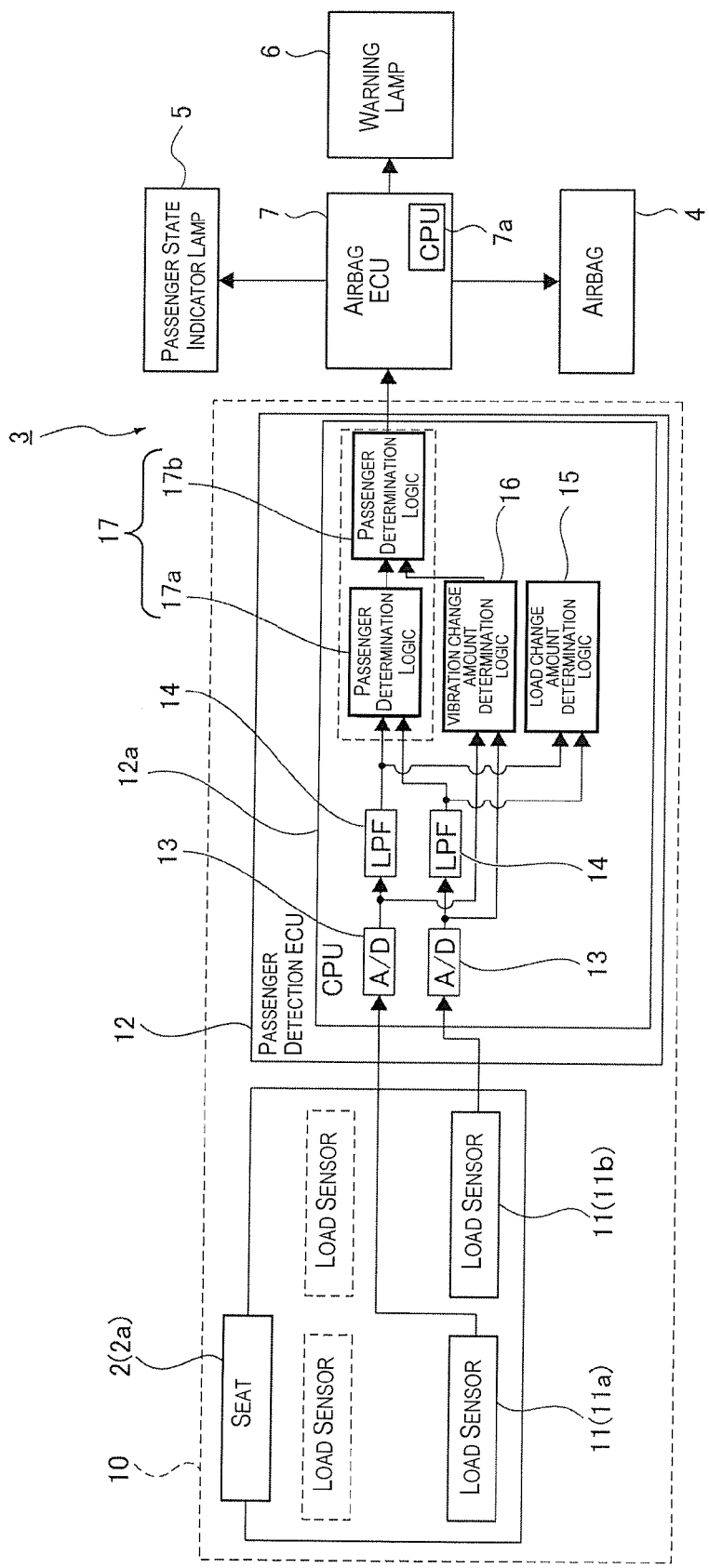
FIG. 2 is a block diagram of an air bag system having a vehicle passenger detection apparatus according to the embodiment.

FIG. 1 is schematic plan view of a vehicle equipped with a vehicle passenger detection apparatus according to one embodiment. FIG. 2 is a block diagram of an air bag system having a vehicle passenger detection apparatus according to the embodiment.

As shown in FIG. 1, a plurality of seats 2 for passengers to sit on and an air bag system 3 that can protect a passenger seated on a seat 2 are installed in a vehicle 1 (automobile or the like). As shown in FIG. 2, the air bag system 3 comprises an air bag 4, a passenger condition indicator lamp 5, a warning lamp 6, an air bag ECU 7, and a vehicle passenger detection apparatus 10.

The air bag 4 is stored frontward of one of the seats 2 (a passenger seat 2a in this embodiment) inside an instrument panel 8 arranged in a frontward portion of a vehicle cabin. The air bag 4 serves to protect a passenger during a vehicle collision by deploying and exhibiting an impact absorbing function. A deployment size of the air bag 4 can be varied to at least two different sizes in accordance with a deployment signal from the air bag ECU 7.

The passenger condition indicator lamp 5 is installed in the instrument panel 8 arranged in a frontward portion of the vehicle cabin and indicates a passenger condition detection result for the passenger seat 2a in accordance with an indication signal from the air bag ECU 7. Examples of passenger conditions include no passenger, seated adult, and child seat.

The warning lamp 6 is installed in the instrument panel 8 arranged in a frontward portion of the vehicle cabin and illuminates as a warning indication in response to a failure signal issued from the air bag ECU 7 when a failure has been detected in the air bag system.

The air bag ECU 7 has an internal CPU 7a and serves to execute a deployment determination with respect to the air bag 4 based on seat information obtained from the vehicle passenger detection apparatus 10 and to issue a deployment signal to the air bag 4. The deployment determination includes such determination results as not to deploy the air bag 4 when a passenger is not sitting in the passenger seat 2a, to deploy the air bag 4 when an adult is sitting in the passenger seat 2a, and not to deploy the air bag 4 when a child seat is being used to seat a child in the passenger seat 2a. The air bag ECU 7 also issues an indication signal to the passenger condition indicator lamp 5 based on seat information obtained from the vehicle passenger detection apparatus 10 and issues a failure signal to the warning lamp 6 when a failure is detected in the air bag system.

The vehicle passenger detection apparatus 10 comprises a plurality of load sensors (load detecting part) 11 and a passenger detection ECU (seat condition determining part) 12 and serves to determine a state of the seat 2 (the passenger seat 2a in this explanation) and send seat information to the air bag ECU 7.

Figure 3A:
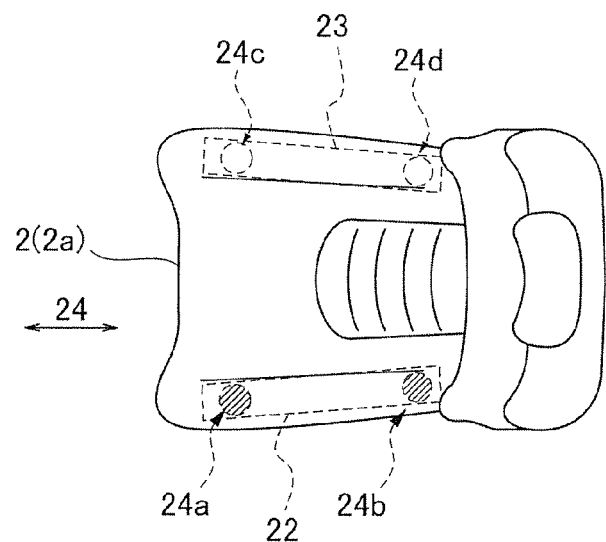
FIG. 3A is a plan view.
Figure 3B:
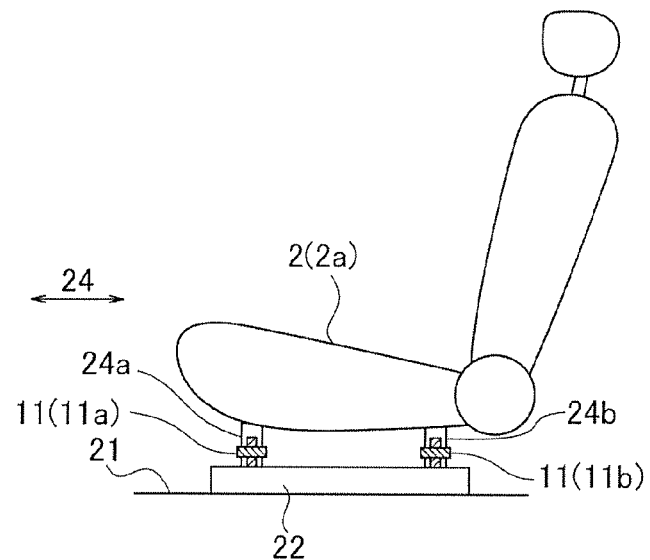
FIG. 3B is a side view.
Figure 3C:
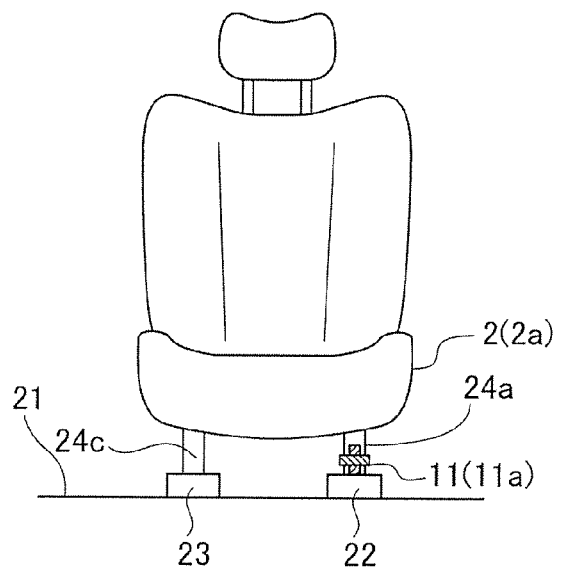
FIG. 3C is a frontal view illustrating an installed state of a load detecting part of a vehicle passenger detection apparatus according to the embodiment with respect to a seat.

The load sensors 11 are attached to a periphery of the passenger seat 2a (one of the seats 2) and detect loads acting on the passenger seat 2a. As shown in FIGS. 3A to 3C, each of the seats 2 (including the passenger seat 2a) is attached to a vehicle body 21 through a left-right pair of slide rails 22 and 23 such that the seat can slide (position can be adjusted) in a longitudinal direction 24 of the vehicle along the slide rails 22 and 23. The seat 2 is supported at a total of four locations with respect to the pair of slide rails 22 and 23, i.e., at front and rear support points 24a to 24d on each of the left and right sides.

Thus, if the seat 2 is supported with respect to the vehicle body 21 at a plurality of support points 24a to 24d, then a load sensor 11 is installed with respect to at least one of the support points 24a to 24d and not installed with respect to at least one of the support points 24a to 24d. In other words, at least one of the support points 24a to 24d does not have a load sensor 11 installed, thus establishing a load detecting part omitted section.

In the illustrated embodiment, a total of two load sensors 11 are provided, i.e., a load sensor 11a is installed with respect to the front support point 24a and a load sensor 11b is installed with respect the rear support point 24b of the slide rail 22, which is the slide rail located more toward an inward side of the vehicle body 21.

Thus, the two support points 24c and 24d where the seat is supported on the slide rail 23 located more toward an outward side the vehicle body 21 are load detecting part omitted sections.

Figure 4:
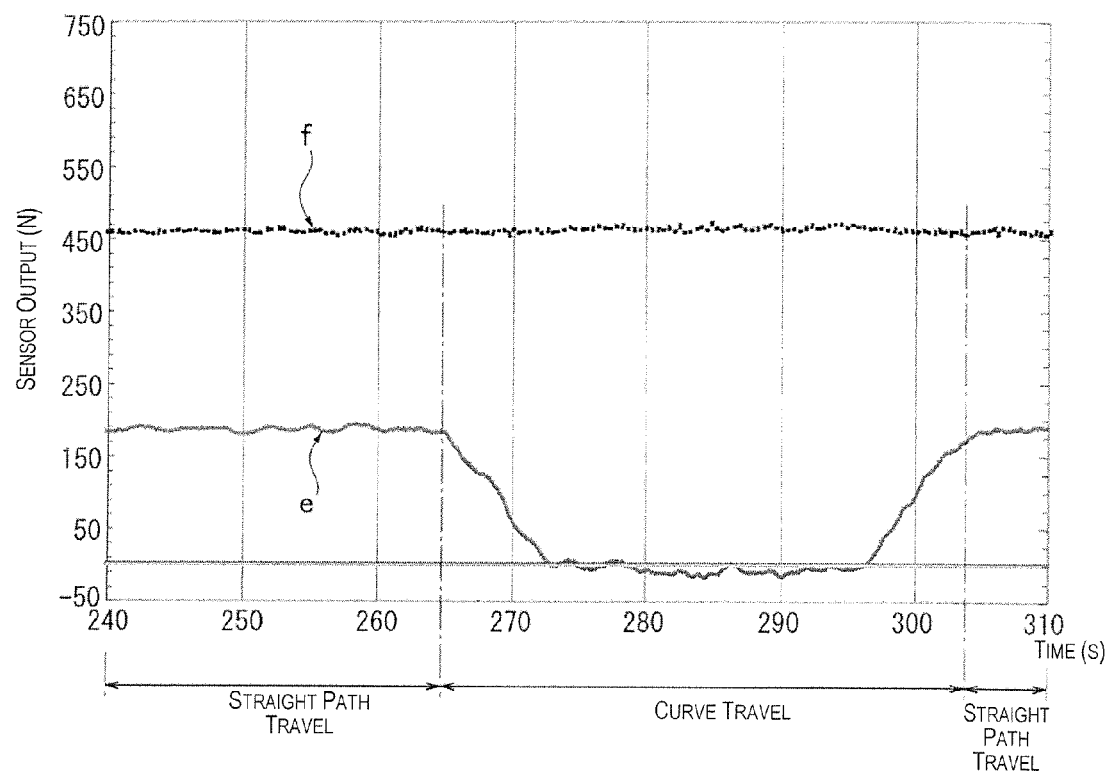
FIG. 4 is a graph showing how a load detection signal differs when the number of load detecting part installed is different.

FIG. 4 is a graph showing how a load detection signal differs when the number of load detecting part installed is different. In FIG. 4, the curve e illustrates a total sum of the load detection signals in a case according to the illustrated embodiment in which two load sensors 11 are provided such that one is located at the frontward support point 24a and one is located at the rearward support point 24b, and the curve f illustrates a total sum of the load detection signals for a case in which a load sensor 11 is provided at each of all four support points 24a to 24d.

The magnitude of the total load detection signal for a case in which load sensors 11 are provided in two locations is approximately one-half the size of the magnitude of the total load detection signal for a case in which load sensors 11 are provided at all four of the support points 24a to 24d when the vehicle is traveling on a straight path, as indicated by the curve e and the curve f. When the vehicle travels through a curve, the magnitude of the total load detection signal decreases greatly in comparison with traveling on a straight path. This phenomenon is believed to be caused by a centrifugal force acting on the side opposite the side where the load sensors 11 are provided and causing the detected load to decrease.

Conversely, when load sensors 11 are installed at all of the support points 24a to 24d, as indicated by the curve f, the magnitude of the total load detection signal is stable regardless of whether the vehicle travels on a straight path or through a curve. This stability is believed to occur because a balance is achieved when the outputs of the load sensors 11 are summed together even if a centrifugal force exists.

It is also acceptable to provide load sensors 11 arranged at a combination of two support points among the support points 24a to 24d other than the combination already explained, i.e., at the front and rear support points 24c and 24d of the slide rail 23 located toward the outward side of the vehicle body 21, at the front support points 24a and 24c, at the rear support points 24b and 24d, or at the diagonally positioned support points 24a and 24d or 24c and 24b. It is also acceptable to provide load sensors 11 in three locations and leave only one of front and rear support points 24a to 24d without. Furthermore, it is acceptable to provide a load sensor 11 at only one of the front and rear support points 24a to 24d. However, since, as previously explained, the magnitude and stability of the total load detection signal degrade as the number of load sensors 11 installed is decreased, it is preferable to install load sensors 11 in two or three locations instead of one.

The passenger detection ECU 12 has a CPU 12a and serves to determine a sitting condition of the seat 2 based on load detection signals from the load sensors 11. The CPU 12a has a signal converting section 13, a vibration waveform removing section 14, a load change amount determination logic (vibration threshold value setting section) 15, a vibration change amount determination logic (vibration determining section) 16, and a seat determining section 17.

The signal converting section 13 converts the analog load detection signals outputted from the load sensors 11a and 11b into digital signals. A separate signal converting section 13 is provided with respect to each of the load sensors 11a and 11b installed on the passenger seat 2a and indicated as "A/D" in FIG. 2.

The vibration waveform removing section 14 removes a vibration waveform indicating that a vibration is occurring from a load detection signal converted to digital by the signal converting section 13 and generates a vibration waveform removed signal. The "vibration waveform" is, for example, a high frequency vibration component (travel vibration) oriented in a vertical direction. The vibration waveform removing section 14 uses a low pass filter that can remove such vibration waveforms as, for example, a high frequency vibration component. A separate vibration waveform removing section 14 is provided with respect to each of the signal converting sections 13 and indicated as "LPF" in FIG. 2.

The load change amount determination logic 15 sets a vibration threshold value based on the vibration waveform removed signal, i.e., the load detection signal resulting after the vibration waveform removing section 14 has removed the vibration waveform from the load detection signal. The threshold value is a value that will serve as a reference when determining if a vehicle vibration is occurring. The load change amount determination logic 15 sets the vibration threshold value to a higher value when the fluctuation amount of the vibration waveform removed signal is small than when the fluctuation amount of the vibration waveform removed signal is large. More particularly, in the illustrated embodiment, when a state in which the fluctuation amount of the vibration waveform removed signal is small has continued for a prescribed amount of time, the vibration threshold value is set to a higher value than when the fluctuation amount of the vibration waveform removed signal is large.

How the vibration threshold value is set will now be explained. A sum of the vibration waveform removed signals is calculated and an absolute value of a fluctuation amount of this sum is calculated as a load fluctuation amount. The load fluctuation amount is then compared to a weight threshold value already prepared in the load change amount determination logic 15. If a state in which the load fluctuation amount is equal to or smaller than the weight threshold value continues for a prescribed amount of time, then the load acting on the passenger seat 2a is stable, i.e., the outputted weight information is stable, and the vibration threshold value is set to a higher value. Meanwhile, if the load fluctuation amount exceeds the weight threshold value, then the load acting on the passenger seat 2a is unstable, i.e., the outputted weight information is unstable, and the vibration threshold value is set to a low value.

The vibration change amount determination logic 16 determines if a vehicle vibration is occurring based on the load detection signal digitized by the signal converting section 13 and the vibration threshold value set by the load change amount determination logic 15. The "load detection signal digitized by the signal converting section 13" is the digital load detection signal as it exists before the vibration waveform is removed by the vibration waveform removing section 14 and, thus, still includes the vibration waveform. How a determination is made as to whether a vehicle vibration is occurring will now be explained. An absolute value of a fluctuation amount of each of the load detection signals from the load sensors 11a and 11b is calculated. A total sum of the absolute values of the fluctuation amounts is calculated as a vibration change amount and the vibration change amount is compared to the vibration threshold value set by the load change amount determination logic 15. If the vibration change amount is equal to or larger than the vibration threshold value, then it is determined that a vehicle vibration is occurring. If the vibration change amount is smaller than the vibration threshold value, then it is determined that a vehicle vibration is not occurring.

The seat determining section 17 executes a seating determination based on a load detection signal or defers the seating determination in accordance with the size of a vehicle vibration. The seat determining section 17 has a passenger determination logic 17a and a passenger determination logic 17b.

The passenger determination logic 17a executes a seating determination based on the vibration waveform removed signal, i.e., the load detection signal resulting after the vibration waveform removing section 14 has removed the vibration waveform from the load detection signal. The "seating determination" mentioned here means to execute a seated passenger determination to determine if a passenger is sitting on the passenger seat 2a and a body type determination to determine if a passenger sitting on the passenger seat 2a has a large body type (e.g., if a seated passenger is an adult or a child using a child seat). It is also acceptable to execute one or the other of these determinations. More specifically, the seating determination involves finding a detected load as a total sum of vibration waveform removed signals and comparing the detected load to a first threshold value, a second threshold value, and a third threshold value already provided in the passenger determination logic 17a. The logic then determines that an adult is sitting if the detected load is equal to or larger than the first threshold value, that a child is sitting using a child seat if the detected load is equal to or larger than the second threshold value but smaller than the first threshold value, and that the seat is empty if the detected load is equal to or larger than the third threshold value but smaller than the second threshold value.

The passenger determination logic 17b determines if the seat information should be updated based on a determination result from the vibration change amount determination logic 16 and sets the obtained seat information to the air bag ECU 7. That is, if the vibration change amount determination logic 16 has determined that a vehicle vibration is not occurring, then the passenger determination logic 17b treats the seating determination result from the passenger determination logic 17a as new seat information and updates the seat information. Meanwhile, if the vibration change amount determination logic 16 has determined that a vehicle vibration is occurring, then the passenger determination logic 17b does not treat the seating determination result from the passenger determination logic 17a as new seat information and maintains the seat information from the previous control cycle.

In this way, the seat determining section 17 executes a seating determination when it has determined that a vehicle vibration is not occurring and maintains the seating determination result of the previous cycle by deferring execution of a seating determination when it has determined that a vehicle vibration is occurring.

Figure 5:
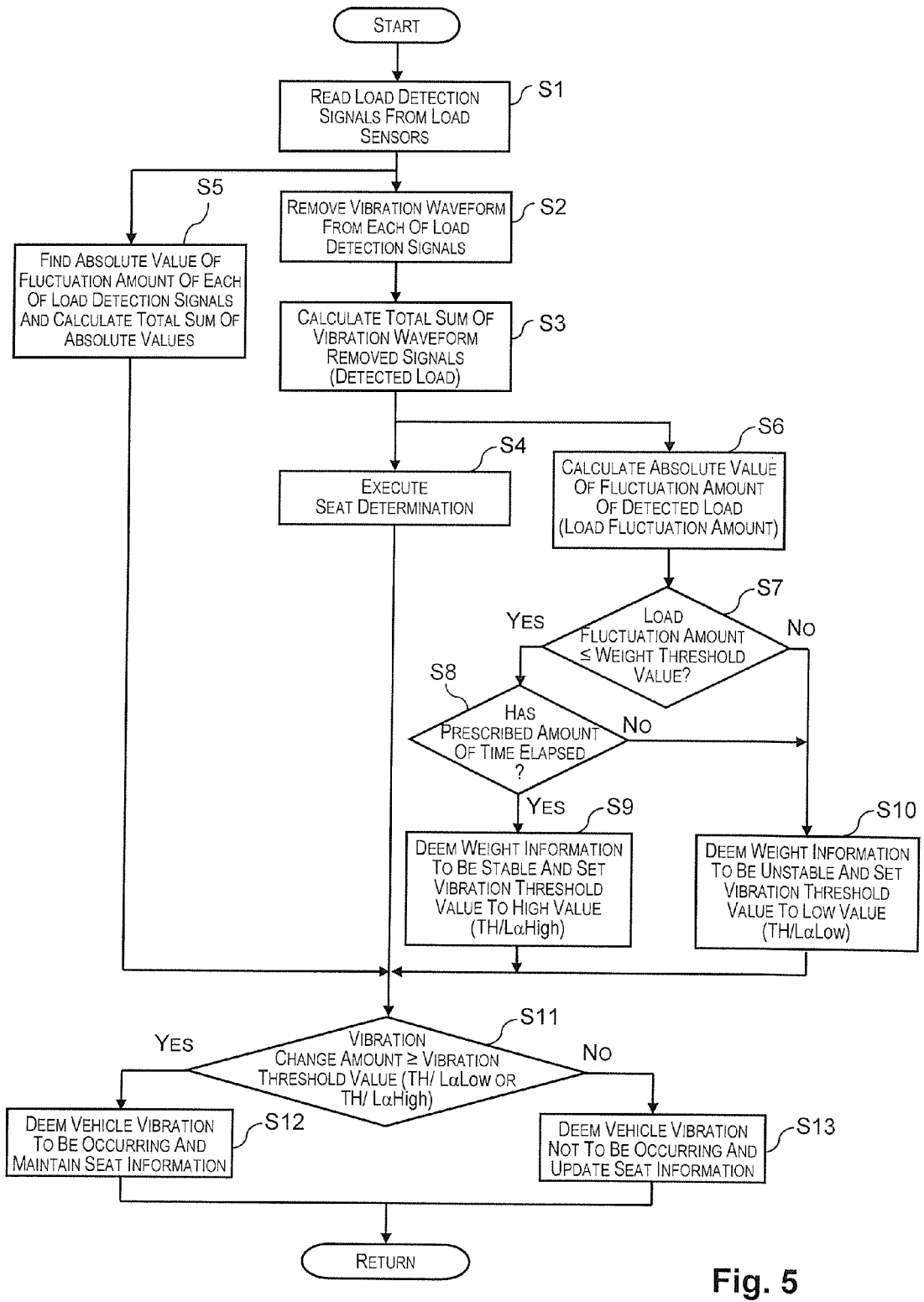
FIG. 5 is a flowchart of a passenger detection process executed by the vehicle passenger detection apparatus according to the embodiment.

FIG. 5 is a flowchart of a passenger detection process executed by the vehicle passenger detection apparatus according to the illustrated embodiment. The steps of FIG. 5 will now be explained.

In step S1, the apparatus reads load detection signals (Sen1(t), Sen2(t)) constituting weight information from each of the load sensors 11a and 11b installed on a seat (the passenger seat 2a in this explanation) and proceeds to step S2 and step S5.

After reading the load detection signals in step S1, in step S2 the apparatus removes a vibration waveform constituting a high frequency vibration component from each of the load detection signals and obtains vibration waveform removed signals (LPF_Sen1(t), LPF_Sen2(t)) corresponding to the load sensors 11a and 11b. The apparatus then proceeds to step S3. The removal of the vibration waveform is accomplished by executing a low pass filter process.

After removing the vibration waveform in step S2, in step S3 the apparatus calculates a detected load W by calculating a sum of the vibration waveform removed signals obtained by removing the vibration waveforms. The apparatus then proceeds to steps S4 and S6.

The detected load W is calculated using the equation (1) shown below.

$$W = LPF\_Sen1(t) + LPF\_Sen2(t) \quad (1)$$

After calculating the detected load W in step S3, in step S4 the apparatus executes a seating determination and proceeds to step S11.

This seating determination involves comparing the detected weight W to a first threshold value TH/Lα1, a second threshold value TH/Lα2, and a third threshold value TH/Lα3 already provided in the passenger determination logic 17a and finding a seating determination result according to the equations (2) to (4) below.

$$W \geq TH/L\alpha1 = \text{adult seated} \quad (2)$$

$$Th/L\alpha1 > W \geq TH/L\alpha2 = \text{child seated in a child seat} \quad (3)$$

$$TH/L\alpha2 > W \geq TH/L\alpha3 = \text{empty seat} \quad (4)$$

After reading the load detection signals in step S1, in step S5 the apparatus finds an absolute value of a fluctuation amount (ΔSen1, ΔSen2) of each of the load detection signals and calculates a sum ΔSum of the absolute values of the fluctuation amounts. The fluctuation amounts correspond to vibration waveforms and the sum is a vibration change amount. The apparatus then proceeds to step S11.

The absolute values (ΔSen1 and ΔSen2) of the fluctuation amounts of the load detection signals are calculated using the equations (5) and (6) show below, and the vibration change amount ΔSum equal to the sum of the absolute values of the fluctuation amounts is calculated using the equation (7). The reason absolute values are used is to prevent the vibration waveforms detected by the load sensors 11a and 11b from cancelling each other out and to emphasize the vibration waveform.

$$\Delta Sen1 = abs(Sen1(t) - Sen1(t-1)) \quad (5)$$

$$\Delta Sen2 = abs(Sen2(t) - Sen2(t-1)) \quad (6)$$

$$\Delta Sum = \{abs(Sen1(t) - Sen1(t-1))\} + \{abs(Sen2(t) - Sen2(t-1))\} \quad (7)$$

After calculating the detected load W in step S3, in step S6 the apparatus calculates a load fluctuation amount ΔW by finding the absolute value of a fluctuation amount of the detected load W and proceeds to step S7.

The absolute value (load fluctuation amount) ΔW of the detected weight W is calculated using the equation (8) shown below.

$$\Delta W = abs(W(t) - W(t-1)) \quad (8)$$

After calculating the load fluctuation amount ΔW in step S6, in step S7 the apparatus determines if the load fluctuation amount ΔW is equal to or smaller than a weight threshold value TH/Lβ already provided in the load change amount determination logic 15. If the determination result is Yes (ΔW ≤ LH/Lβ), then a load fluctuation has not occurred, i.e., the weight information output is stable, and the apparatus proceeds to step S8. If the determination result is No (ΔW > TH/Lβ), then a load fluctuation has occurred, i.e., the weight information is unstable, and the apparatus proceeds to step S10.

After determining that a load fluctuation has not occurred in step S7, in step S8 the apparatus determines if a prescribed amount of time (e.g., 3 seconds) has elapsed. If Yes (the prescribed amount of time has elapsed), then the weight information is stable and the apparatus proceeds to step S9. If No (the prescribed amount of time has not elapse), then a load fluctuation is occurring, i.e., the weight information is unstable, and the apparatus proceeds to step S10.

After determining that the weight information is stable in step S8, in step S9 the apparatus sets the vibration threshold value to a high value (TH/LαHigh) and proceeds to step S11.

After determining that the weight information is unstable in step S7 or step S8, in step S10 the apparatus sets the vibration threshold value to a low value (TH/LαLow) and proceeds to step S11. What is considered a high value and a low value for the vibration threshold value is relative. So long as the relationship TH/LαHigh > TH/LαLow is maintained, any values can be set as the threshold values.

After the seating determination has been executed in step S4, the vibration change amount ΔSum has been calculated in step S5, the vibration threshold value has been set (TH/LαHigh or TH/LαLow) in step S9 or step S10, the apparatus proceeds to step S11 and determines if the vibration change amount ΔSum is equal to or larger than the vibration threshold value (TH/LαHigh or TH/LαLow). If Yes (ΔSum ≥ TH/Lα-

High or TH/LαLow), then the apparatus proceeds to step S12. If No (ΔSum<TH/LαHigh or TH/LαLow), then the apparatus proceeds to step S13.

After determining that the vibration change amount ΔSum is equal to or larger than the vibration threshold value (TH/LαHigh or TH/LαLow) in step S11, in step S12 the apparatus deems that a vehicle vibration is occurring and maintains the seat information of the previous control cycle without treating the seating determination result obtained in step S4 as new seat information. Thus, the apparatus outputs the same seat information as in the previous cycle.

After determining that the vibration change amount ΔSum is smaller than the vibration threshold value (TH/LαHigh or TH/LαLow) in step S11, in step S13 the apparatus deems that a vehicle vibration is not occurring and updates the seat information by treating the seating determination result obtained in step S4 as new seat information. Thus, the apparatus outputs the new seat information obtained in step S4.

The operation of the apparatus will now be explained.

Figure 6:
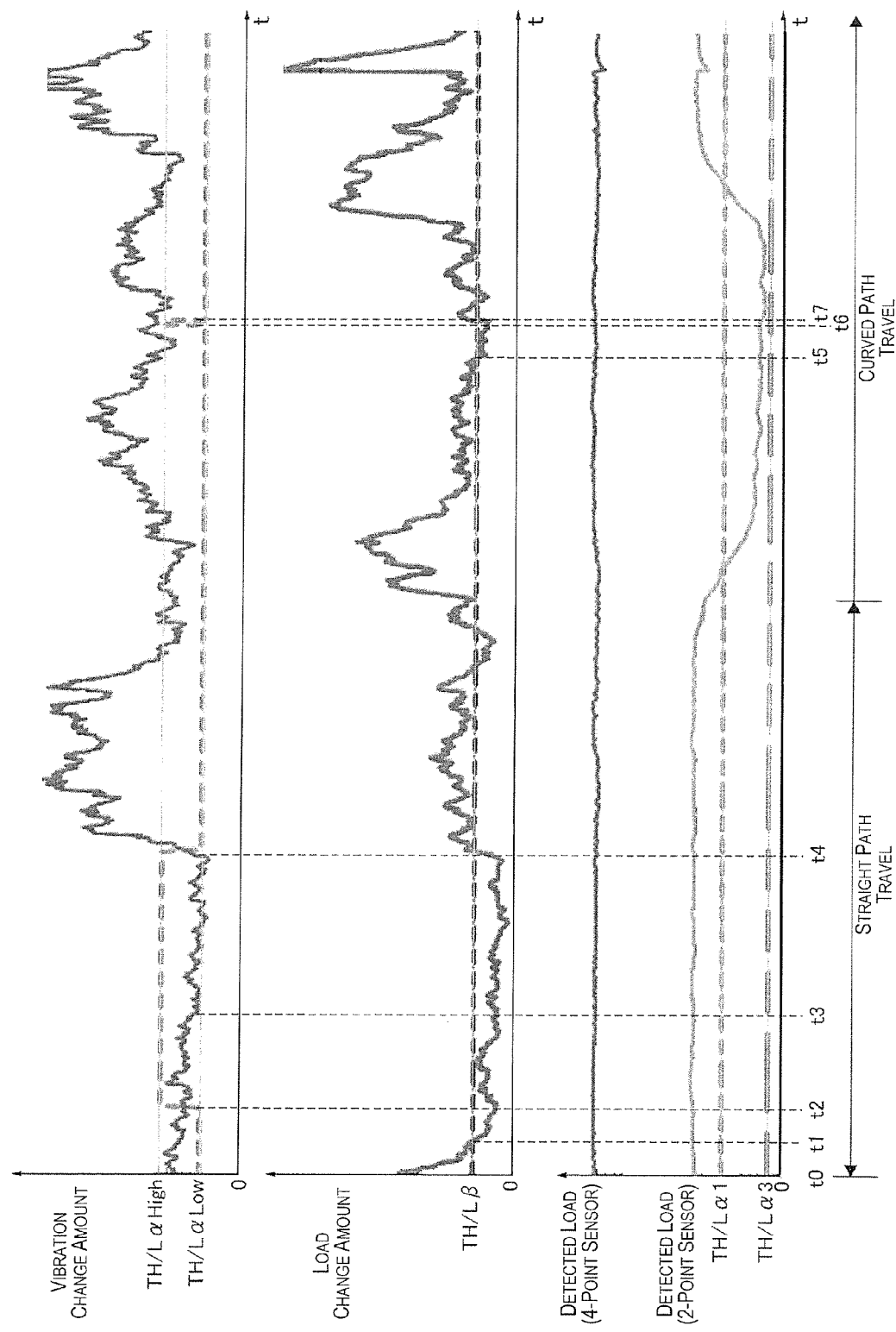
FIG. 6 is a time chart showing characteristic plots of a vibration change amount, a load change amount, a detected load (four-point sensor), and a detected load (two-point sensor) obtained when a vehicle is moving with an adult passenger.
Figure 7:
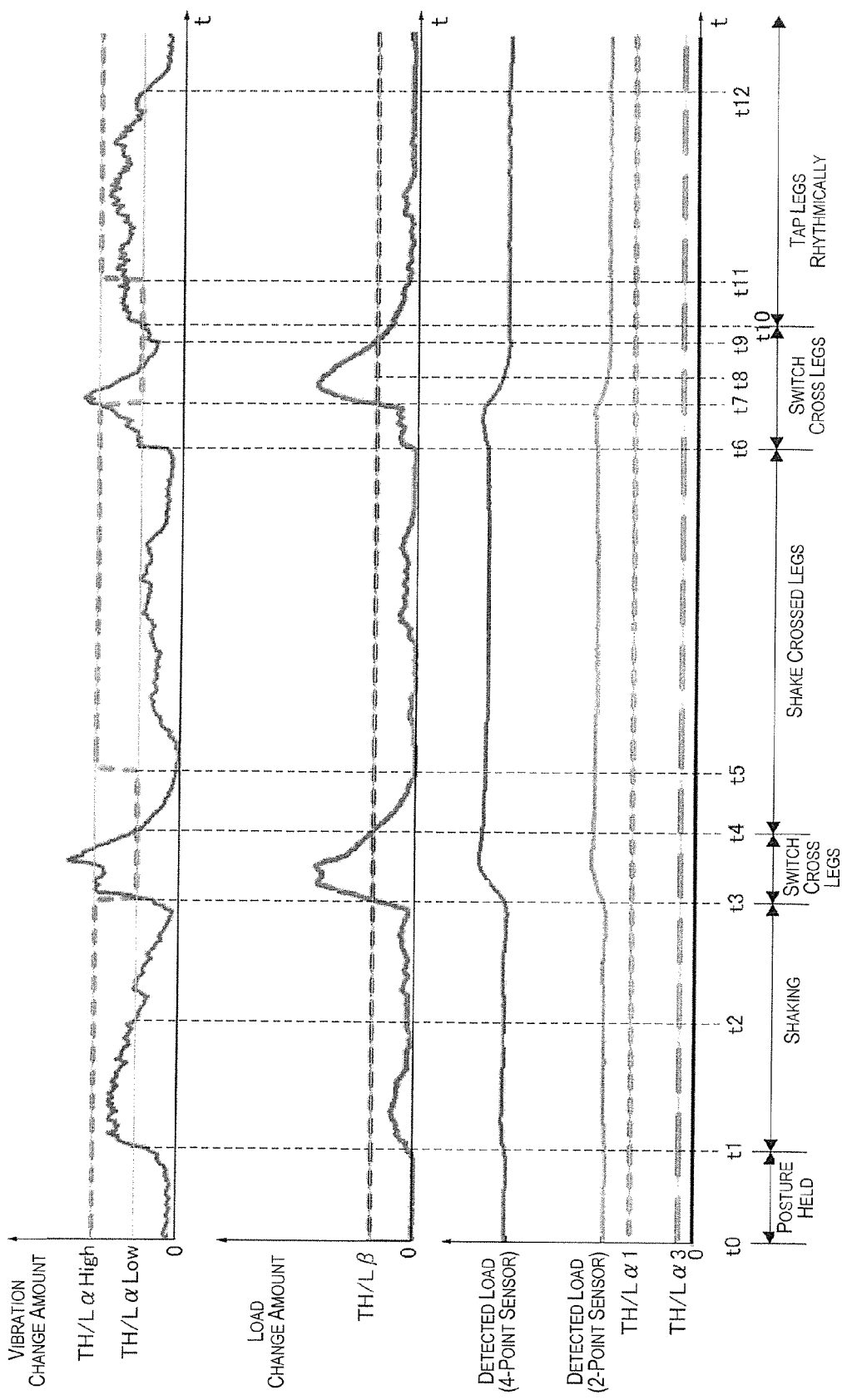
FIG. 7 is a time chart showing characteristic plots of a vibration change amount, a load change amount, a detected load (four-point sensor), and a detected load (two-point sensor) obtained when a vehicle is stopped with an adult passenger.

FIG. 6 is a time chart showing characteristic plots of a vibration change amount, a load change amount, a detected load (four-point sensor), and a detected load (two-point sensor) obtained when a vehicle is moving with an adult passenger. FIG. 7 is a time chart showing characteristic plots of a vibration change amount, a load change amount, a detected load (four-point sensor), and a detected load (two-point sensor) obtained when a vehicle is stopped with an adult passenger.

First a passenger detection process according to a comparative example and disadvantages of the comparative example will be explained. The operation of a vehicle passenger detection apparatus according to the illustrated embodiment will then be explained in terms of passenger detection operation when the vehicle is moving and passenger detection operation when the vehicle is stopped.

Passenger Detection Process According to Comparative Example and Disadvantages Thereof In the passenger detection process according to the comparative example, the seating determination is deferred and the determination result from the previous cycle is maintained when a vehicle vibration is comparatively large and the seating determination is executed when the vehicle vibration is comparatively small. Thus, a vibration threshold value is set in advance with respect to a vibration change amount calculated as the sum of absolute values of fluctuation amounts of a plurality of load detection signals. The vehicle vibration is determined to be large if the vibration change amount is equal to or larger than the vibration threshold value, and the vehicle vibration is determined to be small if the vibration change amount is smaller than the vibration threshold value. A situation in which the vibration threshold value is TH/LαLow will now be considered with reference to FIG. 6 and FIG. 7.

FIG. 6 illustrates the characteristic curves for a vehicle that is moving while carrying an adult passenger (a 49-kg woman). During a period from a time t0 to a time t3, the vibration change amount is above the vibration threshold value TH/LαLow. Therefore, the seating determination is deferred and the determination result from the previous control cycle is maintained. During a period from the time t3 to a time t4, the vibration change amount intermittently falls below the vibration threshold value TH/LαLow. vibration change amount does not stay below the vibration threshold value TH/LαLow continuously. Then, after the time t4, the vibration change amount completely exceeds the vibration threshold value TH/LαLow and the seating determination cannot be executed.

If the vibration change amount is comparatively large while the vehicle is moving, then the seating determination is deferred and an updated determination result cannot be obtained. Thus, for example, if a passenger boards the vehicle while it is stopped and does not sit fully and stably in the seat until after the vehicle is moving, then even though the passenger is seated stably, the seating determination will be deferred while the vehicle is moving and the vehicle vibration is comparatively large. Consequently, there is a possibility that the apparatus will maintain the determination result of the previous cycle without obtaining an appropriate seating determination.

FIG. 7 illustrates the characteristic curves for a vehicle that is stopped while carrying an adult passenger (a 57-kg man). During a period from a time t0 to a time t1, the vibration change amount is below the vibration threshold value TH/LαLow. Therefore, the seating determination is executed. However, during a period from the time t1 to a time t2, the passenger starts shaking his body or knees and causes a vehicle vibration to occur. The vibration change amount during this period is higher than the vibration threshold value TH/LαLow and the seating determination is deferred. During a period from the time t2 to a time t3, the vibration change amount is below the vibration threshold value TH/LαLow and the vibration determination is executed. Then, during a period from the time t3 to a time t4, the passenger switches sides of the crossed legs and causes a large vehicle vibration to occur. The vibration change amount during this period is higher than the vibration threshold value TH/LαLow and the seating determination is deferred. Afterwards, during a period from the time t4 to a time t6, the passenger shakes his legs while keeping them crossed but the vehicle vibration caused is comparatively small. Thus, the vibration change amount is below the vibration threshold value TH/LαLow and the vibration determination is executed. Since the difference between the vibration threshold value TH/LαLow and the vibration change amount is small, it is conceivable that there are times when the vibration change amount exceeds the vibration threshold value TH/LαLow depending on the way the passenger shakes. Afterwards, during a period from the time t6 to a time t8, the passenger switches sides of the crossed legs again and causes a large vehicle vibration to occur. The vibration change amount during this period is higher than the vibration threshold value TH/LαLow and the seating determination is deferred. During a period from the time t8 to a time t10, the vibration change amount temporarily falls below the vibration threshold value TH/LαLow and the seating determination is execute. Then, during a period from the time t10 to a time t12, the passenger's leg movement becomes rhythmical and a vehicle vibration occurs such that the vibration change amount exceeds the vibration threshold value TH/LαLow and the seating determination is deferred.

In this way, even if the vehicle is stopped and the vehicle vibration is comparatively small, a posture or movement of a passenger can cause the vibration change amount to exceed the vibration threshold value TH/LαLow such that the seating determination is deferred. Consequently, there are fewer opportunities for the seating determination to be executed and a seating determination precision could decline.

Passenger Detection Operation when Vehicle is Moving

A vehicle passenger detection apparatus according to the illustrated embodiment, the vibration threshold value is set to a higher value when a fluctuation amount of the load detection signal is small than when a fluctuation amount of the load detection signal is large. Consequently, as illustrated by the characteristic curves shown in FIG. 6 for a case in which an adult (49-kg woman) passenger is carried while the vehicle is moving, if the detected load is stable because the vehicle is traveling along a straight path, then at a time t1 the load change amount will fall below the weight threshold value TH/Lβ at a time t1. As a result, the apparatus will execute step S7 and step S8 of the flowchart shown in FIG. 5. At a time t2 when a state in which the load change amount is smaller than the weight threshold value TH/Lβ has continued for a prescribed amount of time, the apparatus proceeds from step S8 to step S9 and changes the vibration threshold value from the lower value TH/LαLow to the higher value TH/LαHigh. As a result, during a period from the time t2 to a time t4, the vibration change amount is below the vibration threshold value TH/LαHigh and the seating determination is executed even if the vehicle is moving.

At the time t4, the load change amount exceeds the weight threshold value TH/Lβ and the apparatus proceeds from step S7 to step S10 of the flowchart shown in FIG. 5, thereby changing the vibration threshold value from the higher value TH/LαHigh to the lower value TH/LαLow. After the time t4 the vibration change amount exceeds the vibration threshold value TH/LαLow and the seating determination is deferred such that the previous determination result is maintained.

Later, the vehicle travels through a curve and a centrifugal force acting on the seat 2 causes the detected load, i.e., the sum of the load detection signals (vibration waveform removed signals in this embodiment) to decrease greatly in a case where the load detection signals are detected with two sensors. Meanwhile, the load change amount output is comparatively stable. At a time t5 the load change amount falls below the weight threshold value TH/Lβ, and at a time t6 a prescribed amount of time has elapsed with the load change amount continuously below the weight threshold value TH/Lβ. Consequently, at the time t6, the vibration threshold value is changed from TH/LαLow to TH/LαHigh. However, in the case shown in FIG. 6, the load change amount exceeds the weight threshold value TH/Lβ again at a time t7. Consequently, the vibration threshold value does not remain at the value TH/LαHigh and is changed back to the value TH/LαLow such that the seating determination continues to be deferred.

In this way, when the load change amount is small and the detected load output can be determined to be stable, the seating determination can be executed even though the vehicle is moving by increasing the vibration threshold value. As a result, more opportunities to execute the seating determination can be obtained while the vehicle is moving.

Passenger Detection Operation when Vehicle is Stopped

As illustrated by the characteristic curves shown in FIG. 7 for a case in which an adult (57-kg man) passenger is carried while the vehicle is stopped, even if the passenger is shaking his body or knees, the load change amount is below the weight threshold value TH/Lβ during the period from the time t0 to the time t3. Therefore, the vibration threshold value is set to the comparatively high value TH/LαHigh and, since the vibration change amount does not fall below this vibration threshold valve TH/LαHigh, the seating determination is executed during the period from the time t0 to the time t3.

At the time t3, the passenger crosses his legs and the load change amount exceeds the weight threshold value TH/Lβ. The apparatus proceeds from step S7 to step S10 of the flowchart shown in FIG. 5, thereby changing the vibration threshold value from the higher value TH/LαHigh to the lower value TH/LαLow. As a result, the vibration change amount exceeds the vibration threshold value TH/LαLow and the seating determination is deferred such that the previous determination result is maintained.

Afterwards, at a time t4 the load change amount falls below the weight threshold value TH/Lβ, and at a time t5 a prescribed amount of time has elapsed with the load change amount continuously below the weight threshold value TH/Lβ. At the time t5, the vibration threshold value is changed from TH/LαLow to TH/LαHigh. Although the passenger is shaking his crossed legs, the seating determination is executed because the vibration change amount does not exceed the vibration threshold value TH/LαHigh. Since the difference between the vibration threshold value TH/LαHigh and the vibration change amount is large, it is unlikely that the vibration change amount will exceed the vibration threshold value TH/LαHigh even if the passenger shakes somewhat strongly.

At a time t7, the passenger switches sides of the crossed legs and the load change amount exceeds the weight threshold value TH/Lβ, causing the vibration threshold value to be changed from TH/LαHigh to TH/LαLow. As a result, the vibration change amount exceeds the vibration threshold value TH/LαLow and the seating determination is deferred.

The passenger's leg movement becomes rhythmical and a vehicle vibration occurs, but the load change amount decreases and falls below the weight threshold value TH/Lβ at a time t9. At a time t11, a prescribed amount of time has elapsed with the load change amount continuously below the weight threshold value TH/Lβ. Therefore, the vibration threshold value is changed from TH/LαLow to TH/LαHigh. Since the vibration change amount is smaller than the vibration threshold value TH/LαHigh, the seating determination is executed.

In short, the vibration threshold value is set to a higher value when a fluctuation amount of the load detection signal is small than when a fluctuation amount of the load detection signal is large. Thus, the seating determination is less likely to be deferred when a posture or movement of a passenger causes a vehicle vibration to occur while the vehicle is stopped. As a result, more opportunities to execute the seating determination can be obtained when a passenger moves while the vehicle is stopped.

In the vehicle passenger detection apparatus 10 according to the illustrated embodiment, the vibration threshold value is set to a higher value when a state in which the load change amount is below the weight threshold value TH/Lβ has continued for a prescribed amount of time. Consequently, the vibration threshold value does not easily change when the load change amount fluctuates for a short period of time due to road vibration or the like. As a result, the vibration threshold value used as a reference when determining if a vehicle vibration is occurring can be set in a more stable fashion.

Also, in the vehicle passenger detection apparatus 10 according to the illustrated embodiment, the vibration waveform removing section 14 generates the vibration waveform removed signal, i.e., a load detection signal with a vibration waveform removed, from the load detection signals. The load change amount determination logic 15 then sets the vibration threshold values based on the vibration waveform removed signals. The vibration change amount determination logic 16 determines if a vehicle vibration is occurring based on a load detection signal that has been converted to digital by the signal converting section 13. The passenger determination logic 17a executes the seating determination based on the vibration waveform removed signal. Consequently, the load change amount determination logic 15 and the passenger determination logic 17a can set the threshold value accurately and execute an accurate seating determination without being affected by the vibration waveform. The vibration change amount determination logic 16 can also execute an accurate vibration determination by using a load detection signal that includes the vibration waveform. As a result, the precision of both the settings and the determinations can be improved.

In the vehicle passenger detection section 10 according to the illustrated embodiment, the seat 2 (passenger seat 2a) is supported with respect to the vehicle body 21 at a plurality of support points 24a to 24d and the load sensors 11, i.e., a total of two load sensors 11a and 11b, are provided at the two front and rear support points 24a and 24b located on the slide rail 22 located more toward the inward side of the vehicle body 21. Thus, a cost reduction can be achieved because the number of expensive load sensors 11 is fewer than the total number of support points 24a to 24d. Installing a number of load detection sensors 11 smaller than the total number of support points 24a to 24d of the seat 2 is disadvantageous because the sum of the load detection signals is smaller than the load imposed by a passenger and because the apparatus is easily affected by the traveling state of the vehicle (e.g., rightward curve or leftward curve). However, when the vehicle vibration is large, the seating determination is deferred. As a result, the determination precision of the passenger detection does not decline due to reducing the number of load sensors 11 installed.

Effects that can be obtained with a vehicle passenger detection apparatus 10 according to the illustrated embodiment are listed below.

(1) The vehicle passenger detection apparatus 10 comprises: load detecting part (load sensors) 11a and 11b that are installed in the vicinity of a seat (passenger seat) 2a and detect a load acting on the seat 2a; and a seat condition determining part (passenger detection ECU) 12 that determines a condition of the seat 2a based on load detection signals from the load detecting part 11a and 11b. The seat condition determining part 12 comprises: a vibration threshold value setting section (load change amount determination logic) 15 that sets a vibration threshold value based on the load detection signals to serve as a reference when determining if a vehicle vibration is occurring; a vibration determining section (vibration change amount determination logic) 16 that determines if a vehicle vibration is occurring based on the load detection signals and the vibration threshold value; and a seat determining section 17 that executes a seating determination based on the load detection signals when the vibration determining section 16 has determined that a vehicle vibration is not occurring, and defers execution of the seating determination based on the load detection signals and maintains a previous determination result when the vibration determining section 16 determines that a vehicle vibration is occurring. The vibration threshold value setting section 15 sets the vibration threshold value to a higher value when a fluctuation amount of the load detection signal is small than when a fluctuation amount of the load detection signal is large.

As a result, deferments of the seating determination can be decreased and opportunities for executing the seating determination can be increased when the size of a vehicle vibration is used to decide whether to execute or defer the seating determination.

(2) The vibration threshold value setting section (load change amount determination logic) 15 is configured to set the vibration threshold value to a higher value when a state in which the fluctuation amount of the load detection signal is small has continued for a prescribed amount of time than when the fluctuation amount of the load detection signal is large. As a result, the vibration threshold value serving as a reference for determining if a vehicle vibration is occurring can be set in a stable fashion even when the load change amount fluctuations for a short amount of time due to road vibration or the like.

(3) The seat condition determining part (passenger detection ECU) 12 is provided with a vibration waveform removing section 14 that removes a vibration waveform indicating that a vibration is occurring from the load detection signals. The vibration threshold value setting section (load change amount determination logic) 15 finds a vibration threshold value based on the vibration waveform removed signal obtained after the vibration waveform removing section 14 has removed the vibration waveform from the load detection signal, and the vibration determining section (vibration change amount determination logic) 16 determines if a vehicle vibration is occurring based on the load detection signals including the vibration waveform, i.e., the load detection signals as they exist before the vibration waveform has been removed by the vibration waveform removing section 14. The seat determining section 17 executes a seating determination based vibration waveform removed signals, i.e., the load detection signals resulting after the vibration waveform has been removed by the vibration waveform removing section 14. As a result, the threshold value can be set, the seating determination can be executed, and the vibration determination can be executed based on appropriate signals and the settings and determinations can be accomplished with improved precision.

(4) The seat (passenger seat) 2a is supported with respect to the vehicle body 21 at a plurality of support points 24a to 24d and a load detecting part (load sensor) 11 is installed with respect to at least one of the support points (support points 24a and 24b) and not installed with respect to at least one of the support points. As a result, cost reduction can be accomplished without lowering a determination precision.

Although the present invention is explained herein based on the illustrated embodiment of a vehicle passenger detection apparatus according to the present invention, the invention is not limited to this embodiment and includes any design changes, additions, or the like that do not depart from the scope of the invention as set forth in the claims.

In the vehicle passenger detection apparatus 10 according to the illustrated embodiment, the passenger determination logic 17a executes a seating determination regardless of the determination result obtained by the vibration change amount determination logic 16 and decides whether to update or to maintain the seat information based on the determination result obtained with the vibration change amount determination logic 16. However, the invention is not limited to such an approach. For example, it is also acceptable to execute or defer the seating determination based on the determination result obtained with the vibration change amount determination logic 16. Thus, when the vibration change amount determination logic 16 determines that the vehicle vibration is large, the passenger determination logic 17a does not execute the seating determination. With this approach, number of computations executed by the passenger determination logic 17a can be reduced.

In the vehicle passenger detection apparatus 10 according to the illustrated embodiment, the weight threshold value (TH/Lβ) is a fixed value provided in the load change amount determination logic 15 in advance. However, it is acceptable to change the value in response the passenger who is sitting.

For example, the weight threshold value could be set to 1(N) when an adult is sitting and 0.5(N) when a child is sitting in a child seat. In this way, a more nuanced determination can be accomplished.

Additionally, in the vehicle passenger detection apparatus 10 according to the illustrated embodiment, the vibration threshold value is set to a higher value when a state in which the fluctuation amount of the vibration waveform removed signal is small has continued for a prescribed amount of time than when the fluctuation amount of the vibration waveform removed signal is large. However, it is also acceptable to set the vibration threshold value in accordance with changes in the fluctuation amount of the load detection signal. Thus, the vibration threshold value is lowered immediately when the load detection signal falls below the weight threshold value and the vibration threshold value is raised immediately when the load detection signal is exceeds the weight threshold value. With this approach, too, deferments of the seating determination can be decreased and opportunities to execute the seating determination can be increased.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A vehicle passenger detection apparatus comprising:
a load detecting part installed in the vicinity of a seat of a vehicle to detect a load acting on the seat; and
a seat condition determining part configured to determine a condition of the seat based on a load detection signal from the load detecting part, the seat condition determining part including a vibration threshold value setting section configured to set a vibration threshold value based on a load change amount indicative of a change amount of the load acting on the seat such that the vibration threshold value is higher when the load change amount is small than when the load change amount is large, a vibration determining section configured to determine if the vehicle vibration is occurring based on a vibration change amount and the vibration threshold value, the vibration change amount being indicative of a change amount of the load detection signal, and a seat determining section configured to execute a seating determination based on the load detection signal when the vibration determining section determines that the vehicle vibration is not occurring, and to defer execution of the seating determination to maintain a previous seating determination result when the vibration determining section determines that the vehicle vibration is occurring.

2. The vehicle passenger detection apparatus recited in claim 1, wherein
the vibration threshold value setting section is configured to set the vibration threshold value such that the vibration threshold value is higher when a state in which the load change amount is small has continued for a prescribed amount of time than when the load change amount is large.

3. The vehicle passenger detection apparatus recited in claim 1, wherein
the seat condition determining part includes a vibration waveform removing section configured to remove a vibration waveform indicative of a vibration from the load detection signal,
the vibration threshold value setting section is configured to determine the vibration threshold value based on the load change amount indicative of the chance amount of the load acting on the seat obtained based on a vibration waveform removed signal resulting after the vibration waveform removing section has removed the vibration waveform from the load detection signal,
the vibration determining section is configured to determine if the vehicle vibration is occurring based on the vibration change amount obtained based on the load detection signal before the vibration waveform is removed, and
the seat determining section is configured to execute the seating determination based on the vibration waveform removed signal.

4. The vehicle passenger detection apparatus recited in claim 1, wherein
the load detecting part is installed with respect to at least one of a plurality of support points, at which the seat is supported with respect to a vehicle body.

\* \* \* \* \*